United States Patent [19]

Champagne

[11] 4,238,742
[45] Dec. 9, 1980

[54] LASER SYSTEM

[75] Inventor: Louis F. Champagne, Alexandria, Va.

[73] Assignee: The United States of America as represented by the Secretary of the Navy, Washington, D.C.

[21] Appl. No.: 935,203

[22] Filed: Aug. 21, 1978

[51] Int. Cl.³ ............................................. H01S 3/22
[52] U.S. Cl. ........................ 331/94.5 G; 331/94.5 PE
[58] Field of Search .................... 331/94.5 G, 94.5 PE

[56] References Cited

PUBLICATIONS

L. F. Champagne et al., "The Influence of Diluent Gas on the XeF Laser", *Applied Physics Letters*, vol. 31, No. 8, Oct. 15, 1977, pp. 513–515.

L. F. Champagne et al., "Characteristics of the Electron–Beam–Controlled XeF Laser", *Appl. Phys. Lett.* 33(3), Aug. 1, 1978, pp. 248–250.

Rokni et al., "Absorption in Ne-and Ar-Rich XeF* Laser Mixtures", *Appl. Phys. Lett.* 32(10), May 15, 1978, pp. 622–624.

Tisone et al., "Studies of Rare–Gas/Halogen Molecular Lasers Excited by an Electron Beam", *Electronic Transition Lasers*, 1975, pp. 191–194.

Burnham et al., "Transverse Electric Discharge Lasers in $N_2^+$ and XeF", *Electronic Transition Lasers*, 1975, pp. 204–206.

*Primary Examiner*—James W. Davie
*Attorney, Agent, or Firm*—R. S. Sciascia; Philip Schneider; Melvin L. Crane

[57] ABSTRACT

An improved electron-beam-pumped and electron-beam-controlled (EBC) XeF laser in which a diluent gas of neon is used. Addition of neon allows increased optical extraction energies with improved performance which provides greater efficiency with increased optical pulse width.

7 Claims, 3 Drawing Figures

LASER SYSTEM

BACKGROUND OF THE INVENTION

This invention relates to rare gas and rare gas-additive lasers and more particularly to electron-beam-pumped and electron-beam-controlled (EBC) XeF lasers in which neon is used as a diluent gas.

It is well known in the prior art that lasers of various types are in use and experimentation with new types is always under study. Such lasers include solid state, chemical and gaseous types. These laser types are pumped by intense light sources, other lasers, electron beam, and plasma sources. Rare gas-halide lasers have been in existence for a few years with improvements in their operation being made with time and further knowledge being obtained through experimentation. Heretofore several rare gas-halogen species have been made to lase by pumping with an electron beam. These lasers produce relatively short pulse lengths. In these prior-art systems, argon gas has been used as the diluent because its stopping power for electrons was found to be superior to other rare gases. Argon is also essential because it forms an intermediate state leading to the desired excited-state species via the displacement reaction. It has been determined that the presence of a large transient absorption will significantly reduce the efficiency of a XeF laser and will limit the optical length to which these lasers can operate. This places restrictions on those rare gas-halogen systems which can be made to operate at longer pulse lengths by electron beam pumping.

There are several criteria for selecting the rare gas diluent for electron-beam-pumped and electron-beam-controlled lasers operating in ultraviolet regions of the spectrum. When these criteria are satisfied, the transient absorption can be significantly reduced, improved performance and scalability will result for the existing long-pulse lasers and new long-pulse lasers will be obtained.

SUMMARY OF THE INVENTION

This laser system uses neon as a diluent in a XeF laser system. Neon as a diluent reduces or eliminates transient absorption losses found in pure rare-earth gases. With neon as a diluent, the absorption loses are lower and are independent of energy input, thereby increasing the electrical efficiency (energy extracted/energy deposited) of an electron-beam-pumped or electron-beam-controlled XeF laser.

Advantages of using neon as a diluent are improvement of the output power, efficiency and scalability of rare-gas lasers which already operate with a time of approximately 1 $\mu$s.

DETAILED DESCRIPTION

This invention is directed to a rare gas-halide laser in which neon is used as a diluent in a XeF laser system. The gaseous mixture may be excited by an electric discharge, electron-beam-pumped, electron-beam-controlled, UV photons or a combination of the above. The use of neon in a XeF laser reduces significantly the transient optical absorption in the laser medium which increases the efficiency and output power. In the electron-beam-pumped lasers, all of the energy is deposited by the electron beam. In electron-beam-controlled lasers, electron energy is converted directly into preferred excited states where most of the energy is deposited into the gas by the discharge which avoids the inefficiencies of e-beam production and transmission. A suitable laser structure for carrying out this invention is shown in FIG. 1.

Figure 1:
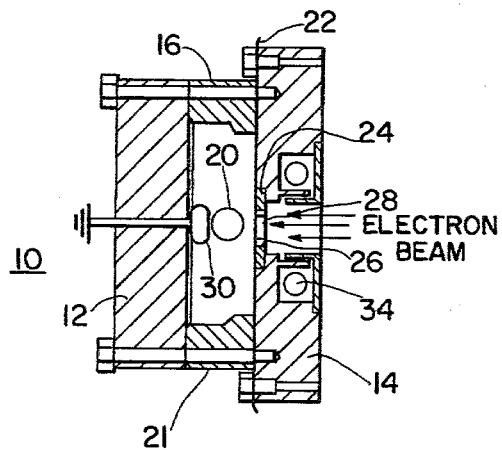
FIG. 1 is a cross-sectional schematic of the laser cell.

FIG. 1 is a cross-sectional schematic drawing illustrating an electron-beam-pumped gaseous laser 10. The laser cell is formed by a rectangular housing including an insulator plate 12 spaced from an adaptor plate 14 of any suitable metal, such as aluminum, by a spacer element 16 made of any suitable material, such as monel, which forms with the insulator plate and adaptor a laser chamber. The spacer element is provided with opposing windows 18 and 20 which are aligned on the optic axis of the laser cell. The windows are made from 2.2 cm-diameter, optical quality $CaF_2$ or fused silica and installed at Brewster's angle 1.25 m apart. The laser cavity is formed by dielectric-coated mirrors 17 and 19 (see FIG. 2) with a radius of curvature of 3 m., separated by 1.5 meters and equally spaced from the windows. One mirror is 99% reflecting. A titanium foil window 22 having a thickness of about 25 $\mu$m is secured between the spacer element 16 and the adaptor 14 and serves as the laser cathode and the window through which excitation electrons pass to the chamber 21. The adaptor is provided with a rectangular cut-out 24 which extends along its length. The face on the cavity side is cut out to provide a seat for an adaptor plate 26 made of aluminum or any other suitable metal which is provided with a rectangular slot 28 with a cross section of 2.6 cm and a length of substantially 100 cm. The slot centers on the axis of the housing. The aluminum adaptor plate permits the electrons 32 to pass through the foil window only at the elongated slot.

Figure 2:
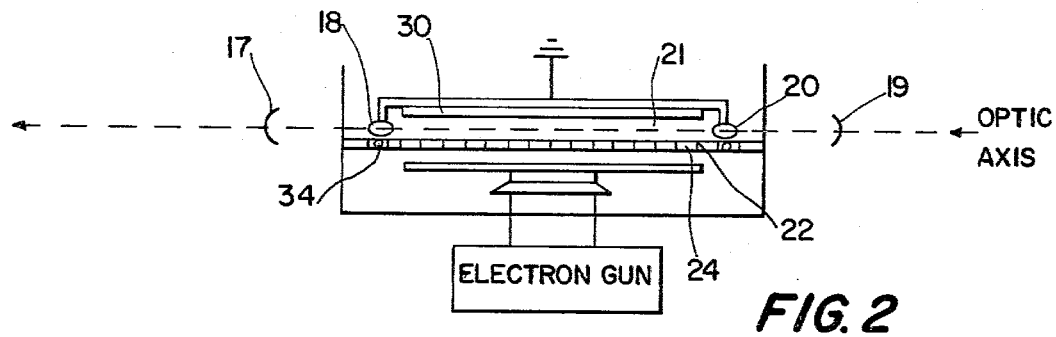
FIG. 2 is a top view illustrating various parts of the laser cell.

The electrons are directed toward the laser anode 30 which extends the length of the chamber as seen in FIG. 2. The laser anode extends for one meter along the length of the chamber directly opposite the slot 28 in the plate through which the electrons pass into the laser chamber. The anode may be connected to a sustainer circuit or grounded as shown. A Maxwell cold-cathode electron gun may be used to generate up to 300 KeV electrons which are directed into the laser chamber. The electron beam current density depends on the pulse lengths and the anode-cathode spacing as set forth in an article "1 $\mu$S LASER PULSES FROM XeF" by L. F. Champagne et al., *Applied Physics Letters* Vol. 30, #3, pp. 160–161, Feb. 1, 1977.

The electron beam spreads out along the length of the laser cell and enters the laser cell through the window covering the slot in the adapter plate. Thus, the electron beam has the same length and cross-sectional dimension as that of the slot in the adaptor plate. The device is provided with a current monitor 34 which surrounds the electron beam near the foil cathode, and measures the current density which is incident on the foil.

It has been determined that there are several criteria for selecting the rare-gas diluent for electron-beam-pumped and electron-beam-controlled lasers operating in the ultraviolet regions of the spectrum. Some of these are (1) The diluent gas must have a stopping power which is comparable to argon. (2) The diluent must exhibit reduced absorption in that part of the spectrum where stimulated emission is expected since it is the most abundant species of the diluent. (3) Absorption at the laser wavelength is further reduced by approximately a factor of 10 by using Penning mixtures, the requirement being that the metastable atom of the main gas be sufficiently energetic to ionize the admixture gas in a single collision. (4) Formation-channels by which the excited-state species is formed should remain possible, or be replaced by alternate formation-channels of comparable efficiency.

In carrying out the operation of the laser system, the gaseous mixture including a main gas, an admixture gas, and a donor gas is admitted to the laser chamber in the desired ratio and brought to the desired pressure. It has been determined that neon can be added over a range from about 80% to 99.9% of the total gaseous mixture depending upon the gases used. For maximum output power, the optimum concentration for different gas mixtures is as follows: Ne:Xe:NF$_3$::99:0.18:0.06, at a pressure of 5 atm; Ne:Xe:HCl::98.933:10:0.067 at a pressure of 3 atm; Ne:Kr:F$_2$::97.18:2.7:0.12 at a pressure of 4 atm: Ne:Ar:N$_2$::80:19:1 at a pressure of from 3-5 atm. Since the stopping power of argon is double that of neon, the pressure of mixtures using argon would be half those using neon.

As an example, electron-beam pulses of 1 $\mu$sec width with a variable intensity up to 8 A/cm$^3$ are incident to the gas medium through the slot in the adaptor plate. Thus, the excitation electrons extend along substantially the entire length of the laser anode. The electron pulse excites the gas molecules in the gas resulting in a population inversion for the excited states of the gas. The kinetics for the Ne:Xe:NF$_3$ laser are described by the following in which the primary formation of the excited species is via PENNING IONIZATION:

$$Ne^*(Ne_2)^* + Xe \rightarrow Xe^+ + Ne\,(Ne_2) + e$$

$$F^* + Xe \rightarrow Xe^+ + F + e$$

$$Xe^+ + F^- \rightarrow XeF^*$$

In this three-component mixture, neon as the main gas eliminates the possibility of forming the excited-state species via displacement reaction because NeF* predissociates very rapidly. In the case where the predominant diluent is neon, small amounts of argon and/or krypton may be added to the laser mixture. This permits the formation of the excited state species by displacement reaction without the disadvantage of large contribution to absorption.

In a displacement reaction, a rare-gas, monohalide, excited-state species collides with a ground-state atom of higher atomic number. The atom with the higher atomic number displaces the atom with the lower atomic number and a new excited-state, rare-gas, monohalide species is formed. The output power of an electron-beam-pumped XeF laser with argon diluent is limited by transient absorption processes which occur at the laser wavelength during the excitation pulse. Transient absorption is due to processes which occur in the pure rare gases and the effect of these processes can be reduced or eliminated in the presence of the laser constituents. In neon diluent, the absorption losses are lower and are independent of input energy. Neon increases the electrical efficiency (energy extracted/energy deposited) of the XeF laser at the maximum output power to 1.8% and the volumetric output at 2.8 J/l.

Figure 3:
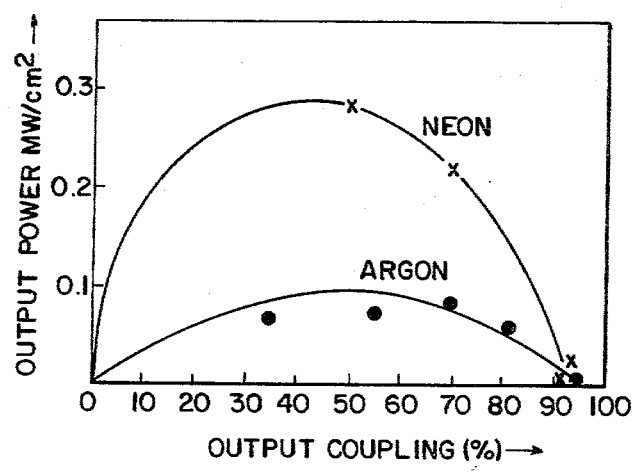
FIG. 3 illustrates the XeF laser output power as a function of output coupling for neon and argon diluents.

FIG. 3 illustrates the output power of a XeF laser as a function of output coupling for neon and argon diluents. These curves were obtained with the same excited-state concentrations of the admixture but the pressure of neon was twice that of argon to keep the energy deposited in the gas by the electron beam equal for the two diluents. In each case, the energy input was kept constant at 158 J/l. It has been determined that the efficient attained with neon rises with pressure up to .5 atm whereas the efficiency of argon falls at pressures above 2.5 atm.

It has also been determined that neon is 4 times more efficiency than argon with an optical energy extraction of 2.8 J/l. The improvement is due to a reduction in the optical absorption in the medium. The magnitude of the optical absorption is dependent on which rare gases are used, and on their concentration.

A modified version of Rigrod's formula (J. Applied Physics, 36, page 2487, 1965) for radiation intensity, I, for optical lasers can be used to calculate the saturation intensity gain and loss for output couplings.

$$\frac{I}{I_s} = (1-A)\frac{1-(r)^{\frac{1}{2}}}{1-(1/A)^2(r)^{\frac{1}{2}}}\{g_0L + \ln[(1-A)^2(r)^{\frac{1}{2}}]\}$$

where
$g_o$ = small-signal gain coefficient
$L$ = length of the excitation region.
$I_s$ = saturation intensity
$1-(1-A)^2$ = single pass loss
$r$ = reflectivity of the output mirror
$A$ = fraction of power absorbed.

This formula includes a lumped loss just in front of each mirror (as an approximation to loss in the laser medium itself) which absorbs a fraction A of the power incident upon it. Since the laser beam passes each lumped loss twice in a round trip, the single pass loss represented by each trip is $[1-(1-A)^2]$.

It has been determined that neon as a diluent and the use of two-component Penning mixtures in which neon is the predominant component yields improved efficiency and output power under long pulse operating conditions (>0.5 $\mu$s) for KrF*, N$_2$(C$\rightarrow$B) and XeCl. These criteria can be used to demonstrate new long-pulse lasers in XeBr*, I$_2$ and, under certain conditions, XeI. Additionally, the use of neon as diluent decreases loss in the trimer species Kr$_2$F, XeF*(c), Xe$_2$Cl and KrXeF. Broadband fluorescent emission in the 400–500 nm region has been attributed to the latter species.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an improved electron-beam-excited XeF gas laser including an elongated laser cell constructed with optically aligned end windows positioned at Brewster's angle, mirror means forming a laser cavity relative to said laser cell, and window means for passing electrons into said laser cell, the improvement comprising:
   a XeF gaseous mixture within said laser cell in which neon is employed as a diluent.
2. The improvement claimed in claim 1 wherein:

said neon is mixed with small amounts of argon xenon, and/or krypton.

3. The improvement claimed in claim 1 wherein: said neon is mixed with Xe and $NF_3$.

4. The improvement claimed in claim 1 wherein: said neon diluent is combined with a two-component Penning mixture in which neon is the predominant component.

5. The improvement claimed in claim 1 wherein: said neon is mixed with Xe and HCl.

6. The improvement claimed in claim 1 wherein: said neon is mixed with Kr and F.

7. The improvement claimed in claim 1 wherein: said neon is mixed with Ar and $N_2$.

* * * * *